(12) United States Patent
Takagi et al.

(10) Patent No.: US 8,488,073 B2
(45) Date of Patent: Jul. 16, 2013

(54) AUTOSTEREOSCOPIC IMAGE DISPLAY APPARATUS

(75) Inventors: Ayako Takagi, Yokosuka (JP); Tatsuo Saishu, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 78 days.

(21) Appl. No.: 13/165,259

(22) Filed: Jun. 21, 2011

(65) Prior Publication Data
US 2012/0057087 A1    Mar. 8, 2012

(30) Foreign Application Priority Data

Sep. 8, 2010 (JP) ................................. 2010-201322

(51) Int. Cl.
*G02F 1/1335* (2006.01)
*G02F 1/1339* (2006.01)

(52) U.S. Cl.
USPC .............................................. 349/15; 349/155

(58) Field of Classification Search
USPC ..................................................... 349/15, 155
See application file for complete search history.

(56) References Cited

U.S. PATENT DOCUMENTS

| | | | |
|---|---|---|---|
| 5,530,567 A * | 6/1996 | Takei ............................... | 349/86 |
| 8,139,195 B2 * | 3/2012 | Emig et al. ..................... | 349/155 |
| 2008/0259233 A1 * | 10/2008 | Krijn et al. ...................... | 349/15 |
| 2009/0161059 A1 * | 6/2009 | Emig et al. ..................... | 349/155 |
| 2010/0238276 A1 * | 9/2010 | Takagi et al. .................... | 348/54 |

FOREIGN PATENT DOCUMENTS

| | | |
|---|---|---|
| JP | 08-328002 | 12/1996 |
| JP | 2007-171908 | 7/2007 |
| JP | A-2008-076782 | 4/2008 |
| JP | 2010-170068 | 8/2010 |

OTHER PUBLICATIONS

Takagi et al, Autostereoscopic partial 2-D/3-D switchable display using liquid-crystal gradient index lens in SID International Digest Technical Papers, 2010, SID, vol. 41, Book 1, pp. 436-439.*
Office Action mailed Jul. 31, 2012 issued in corresponding JP application No. 2010-201322 (and English translation).
Background Art Information Sheet provided by applicants (Jan. 20, 2011) (1 page total).

* cited by examiner

*Primary Examiner* — Edward Glick
*Assistant Examiner* — Mark Teets
(74) *Attorney, Agent, or Firm* — Posz Law Group, PLC

(57) ABSTRACT

An autostereoscopic image display apparatus according to an embodiment includes: a plane display device including pixels arranged in a matrix form; and an optical plate provided in front of the plane display device to control light rays illuminated from the pixels. The optical plate includes: first and second substrates, each being transparent to light; liquid crystal sandwiched between the first substrate and the second substrate; first electrodes arranged periodically on a first plane of the first substrate opposed to the second substrate; second electrodes disposed on the first plane of the first substrate and between the first electrodes adjacent to each other; a third electrode provided on a second plane of the second substrate opposed to the first substrate; and at least one spacer provided between the first substrate and the second substrate to hold a space between the first substrate and the second substrate. The spacer is disposed on the first electrode.

10 Claims, 10 Drawing Sheets

AUTOSTEREOSCOPIC IMAGE DISPLAY APPARATUS

CROSS-REFERENCE TO RELATED APPLICATION

This application is based upon and claims the benefit of priority from prior Japanese Patent Application No. 2010-201322 filed on Sep. 8, 2010 in Japan, the entire contents of which are incorporated herein by reference.

FIELD

Embodiments described herein relate generally to an autostereoscopic image display apparatus.

BACKGROUND

In recent years, development of stereoscopic image display apparatuses (autostereoscopic image display apparatuses) without glasses has been promoted. Many of them use an ordinary plane display device. Angles of light rays illuminated from the plane display device are controlled by placing some optical plate in front of or behind a display plane of the plane display device. When viewed from a viewer, therefore, light rays look as if they are illuminated from objects located at several cm away from the plane display device in front of or behind it due to binocular parallax.

It is said that in the autostereoscopic image display apparatus the resolution of a three-dimensional image, the depth projection reproduction capability thereof, and the viewing angle thereof are in trade-off relations. For example, it is now supposed that a liquid crystal display device (hereafter referred to as LCD as well) which displays an elemental image is disposed behind a slit or a lens which controls light rays as an optical plate included in the autostereoscopic image display apparatus. If in this case the number of parallaxes is determined and the viewing angle serving as a range in which a parallax image is distributed is narrowed, then the light ray density becomes high and the depth projection reproduction capability increases, but the range in which the stereoscopic image is visible normally becomes narrow. If the number of parallaxes is determined and the viewing angle is made wider, then the depth projection reproduction capability decreases, but the range in which the stereoscopic image is visible normally becomes wide.

Furthermore, development of an autostereoscopic image display apparatus having a changeover function between two-dimensional image display and three-dimensional image display is conducted. In this autostereoscopic image display apparatus, a lenticular lens is not used as the optical plate, but, for example, a gradient index lens having a structure obtained by filling a space between two parallel transparent substrates with liquid crystal and providing inclination of directors of liquid crystal with distribution by means of voltage control of the liquid crystal is used as the optical plate. This gradient index lens becomes a liquid crystal GRIN lens (gradient index lens) based on refractive index distribution depending upon the place generated when light rays having a determinate polarization direction is incident on two parallel transparent substrates. Since this GRIN lens can be switched to ON and OFF by changing a voltage, it can be utilized to change over between two-dimensional image display and three-dimensional image display.

However, use of the gradient index lens as the optical plate in the autostereoscopic image display apparatus having the changeover function between two-dimensional image display and three-dimensional image display poses a problem that display degradation is caused by disposition of spacers used in this gradient index lens.

DETAILED DESCRIPTION

Hereafter, embodiments according to the present invention will be described more specifically with reference to the drawings.

An autostereoscopic image display apparatus according to an embodiment includes: a plane display device comprising pixels arranged in a matrix form; and an optical plate provided in front of the plane display device to control light rays illuminated from the pixels. The optical plate includes: first and second substrates, each being transparent to light; liquid crystal sandwiched between the first substrate and the second substrate; first electrodes arranged periodically on a first plane of the first substrate opposed to the second substrate and supplied with a first voltage; second electrodes disposed on the first plane of the first substrate and between the first electrodes adjacent to each other and supplied with a second voltage which is lower than the first voltage; a third electrode provided on a second plane of the second substrate opposed to the first substrate and supplied with a third voltage which is equal to or less than the second voltage; and at least one spacer provided between the first substrate and the second substrate to hold a space between the first substrate and the second substrate. The spacer is disposed on the first electrode.

Figure 1:
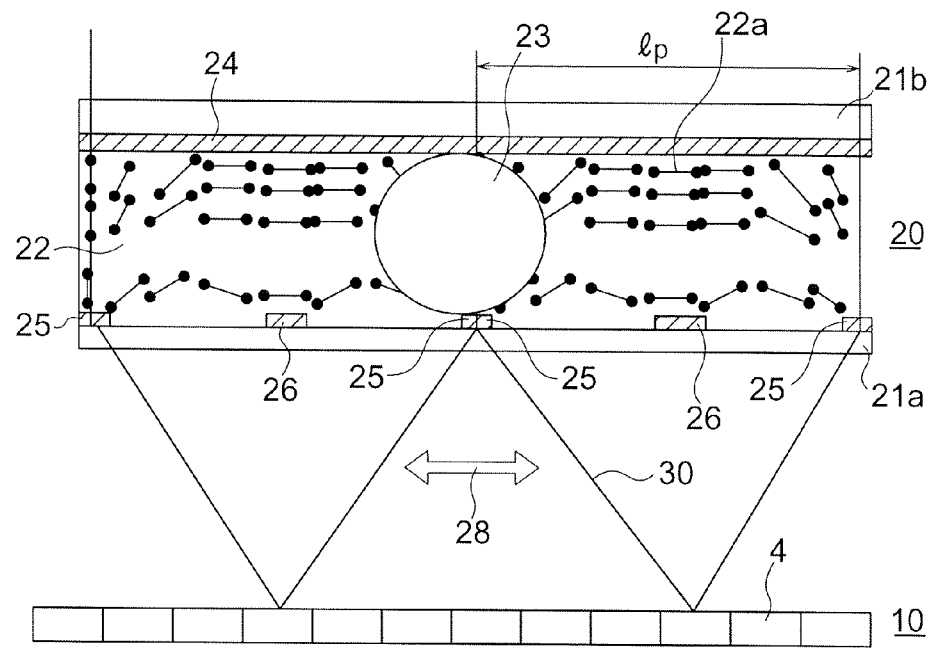
FIG. 1 is a sectional view of an autostereoscopic image display apparatus according to an embodiment.

As shown in FIG. 1, an autostereoscopic image display apparatus according to the present embodiment includes a plane display device 10 having pixels 4 arranged in a matrix form, and a gradient index lens 20 provided in front of the plane display device as an optical plate which controls light rays illuminated from the pixels 4. The gradient index lens 20 includes two transparent substrates 21a and 21b disposed in parallel and formed of, for example, glass, liquid crystal 22 sandwiched between the substrates 21a and 21b, a spacer 23 provided in the liquid crystal 22 to maintain an interval between the substrates 21a and 21b, an opposed electrode 24 which is provided on a plane opposed to the substrate 21a and which is grounded, electrodes (power supply electrodes) 25 which are provided at predetermined intervals, i.e., periodically on a plane of the substrate 21a opposed to the substrate 21b and which are supplied with a power supply voltage (drive voltage), and electrodes 26 which are provided between the power supply electrodes 25 and which are supplied with a ground voltage. The opposed electrode 24 is provided to be opposed to the electrodes 25 and 26. One lens is formed between adjacent power supply electrodes 25, and the distance between the adjacent power supply electrodes 25 becomes a lens pitch lp. A maximum voltage is applied to liquid crystal 22 located between the power supply electrode 25 and the opposed electrode 24, and a minimum voltage is applied to liquid crystal located between the ground electrode 26 and the opposed electrode 24. In the present embodiment, each of the power supply electrodes 25 extends along a column direction of a pixel 4, and the power supply electrodes 25 are provided in a plurality of columns. A part between adjacent power supply electrodes 25 corresponds to a lenticular lens in a lenticular sheet. Incidentally, the power supply electrodes 25 may be arranged in a matrix form. In this case, a fly eye lens is formed. Furthermore, a voltage which is lower than a voltage applied to the electrodes 26 and which is higher than a voltage applied to the opposed electrode 24 may be applied to the electrodes 26. In this case, it is desirable that the voltage applied to the electrodes 26 becomes approximately equal in value to the voltage applied to the opposed electrode 24.

The principle of the autostereoscopic image display in the present embodiment will now be described with reference to FIG. 1. If the focal length of the lens 20 is made to coincide with the distance between the lens 20 and the pixel 4, the pixel 4 is expanded within the lens pitch lp, and parallax light rays 30 are illuminated in directions obtained by expanding a direction of an extension line which couples the center of the lens to one of the pixels 4. The expanded pixel differs according to the angle. Therefore, the viewer views different parallax images with left and right eyes, and consequently the viewer perceives a stereoscopic image.

Features and problems of this gradient index lens 20 will now be described. The gradient index lens 20 utilizes the following properties of the liquid crystal.

As for the property of liquid crystal, when an area which is sufficiently large as compared with the size of liquid crystal molecules is considered, the orientation direction of a molecule which is average among them is represented by using a unit vector n, and it is referred to as a director 22a or orientation vector. An orientation in which the directors 22a become nearly parallel to the substrates 21a and 21b is referred to as homogeneous orientation. One of the greatest features of liquid crystal is optical anisotropy between a direction parallel to the directors 22a and a direction perpendicular to the directors 22a. Especially, since flexibility in arrangement of molecules is high as compared with other anisotropic media such as liquid crystal, the difference in refractive index between the major axis and the minor axis which is a measure of birefringence is great. If liquid crystal is perpendicularly inclined at a certain determinate angle θ from the incident polarization direction, a middle refractive index of the major axis and the minor axis can be taken. Therefore, it becomes possible to provide liquid crystal with inclination distribution by applying vertical electrical fields or oblique electrical fields to liquid crystal with a certain determinate period, and refractive flux distribution can be obtained. The display characteristics are made uniform in the plane by keeping the space between the two parallel substrates 21a and 21b constant over the whole face of the panel by means of the spacers 23.

When implementing changeover between two-dimensional image display and three-dimensional image display by using the gradient index lens as the optical plate of the stereoscopic image display panel of the PC (Personal Computer), portable telephone, or portable terminal, there are two problems described below.

One of the problems is increase of the viewing angle in multiple parallaxes. When the viewer views a solid object, the cubic effect increases if the viewer gets nearer the object to view it. This is because the parallax between the left and right eyes increases as the viewer gets nearer and nearer. Furthermore, since the PC, portable telephone and portable terminal need to be operated with hands, the viewing distance between the autostereoscopic image display apparatus and the viewer is as short as approximately 40 to 70 cm as compared with the TV receiver. If it is attempted to implement a natural autostereoscopic image display apparatus which is easy to see without fixing the head at the viewing distance, a viewing zone width which is approximately twice the distance of 6.5 cm between left and right eyes will be needed. For example, a viewing angle 2θ for implementing the viewing zone width of 13 cm with a viewing distance of 40 cm is calculated.

$$2\theta = 2 \times \tan(6.5/40) = 18.8 \text{ degrees}$$

It is desirable that the viewing zone width 20 is at least 19 degrees or more.

In general, if uniform stress is applied to a substance and a change is caused in a distance between two points such as adjacent molecules in a substance, then a restoring force which resists the change is generated. In the liquid crystal, there is an order concerning directions of molecules. When spatial nonuniformity has occurred in directors which indicate an average orientation direction, free energy in that area increases and a restoring force which resists the change in the directors exerts. In other words, the director direction of the liquid crystal can be predicted according to an elasticity theory in which the property of elasticity caused by a local change of the liquid crystal is regarded as a continuum. A gradient index lens using liquid crystal needs to have refractive index distribution which reproduces the lens shape in the director direction of the liquid crystal. In addition, it is possible to shorten the focal length and increase the viewing angle by increasing the thickness of the gradient index lens and increasing the refraction force caused by the refractive index distribution.

In addition, more natural stereoscopic display is made possible by smooth motion parallax owing to multiple parallaxes. Since the lens pitch increases, however, the lens thickness also must be increased if it is attempted to maintain the same viewing angle.

The thickness of the typical LCD is approximately 5 μm. If liquid crystal having refractive index anisotropy of Δn=0.15 or more is used and a viewing angle of 19 degrees or more with a lens pitch of 350 μm or more is to be implemented, then the thickness of the gradient index lens becomes 100 μm or more in the case of the gradient index liquid crystal lens.

For maintaining the thickness of the gradient index lens in the panel, spherical or columnar transparent spacers are scattered in the panel. If the thickness of the transparent spacers becomes as great as 100 μm or more, the spacers are perceived visually because of a refractive index difference between the liquid crystal and the spacers.

In the case of a display apparatus having a changeover function between two-dimensional image display and three-dimensional image display, refractive index distribution in the two-dimensional image display is different from that in the three-dimensional image display. In the case of two-dimensional image display, directors of the liquid crystal are arranged in parallel to the orientation plane and the same refractive index is taken over the whole plane, as described later.

On the other hand, in the case of three-dimensional image display, liquid crystal rises in a place where a maximum voltage is applied, and the liquid crystal is aligned in parallel to the orientation plane in a place where a minimum voltage is applied. If light in the polarization direction perpendicular to the electrodes is incident, the refractive index distribution differs over the lens pitch. Furthermore, the material of commercially available spacers is limited, and the material does not correspond to all refractive indexes.

In the case of the three-dimensional image display, therefore, the refractive index in the lens pitch differs depending upon the place. Accordingly, an optimum spacer in the lens pitch must be disposed to correspond to the refractive index of the spacer.

Furthermore, in the case of the two-dimensional image display, the in-plane refractive index is constant and consequently the refractive index difference is the same in any place. For eliminating the visual perceptivity of the spacers at the time of the two-dimensional image display, therefore, it is desirable to bring a refractive index Ne at the time when light lays are incident in the director direction of the liquid crystal close in value to a refractive index ns. However, its condition is not yet found.

Therefore, the present inventors have found an optimum position concerning the spacers 23 in the gradient index lens 20 as described heretofore.

Figure 2:
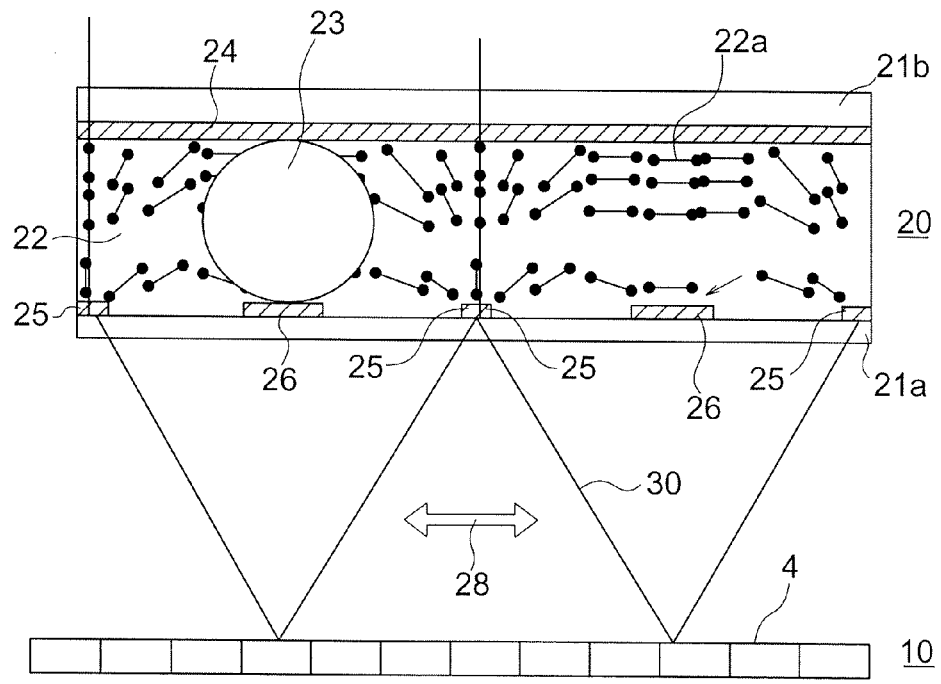
FIG. 2 is a sectional view of an autostereoscopic image display apparatus according to an embodiment.

FIG. 1 shows the case where each of the spacers 23 is disposed in a position (lens end) where the refractive index is the lowest in the lens pitch lp, i.e., on one of the power supply electrodes 25 when the refractive index of the spacers 23 is ns. FIG. 2 shows the case where each of the spacers 23 is disposed in a position (lens center) where the refractive index is the highest in the lens pitch lp, i.e., on the ground electrode 26 when the refractive index of the spacers 23 is ns.

An alignment film is not applied to the spacers 23, and distribution of surrounding directors 22a is not disturbed. If the spacer 23 is disposed at the lens end as shown in FIG. 1, therefore, the inclination of the liquid crystal directors 22a is great in the polarization direction 28 which is incident in parallel to the liquid crystal directors 22a and consequently the refractive index in the surroundings is low. On the other hand, if the spacer 23 is disposed in the lens center as shown in FIG. 2, therefore, the inclination of the liquid crystal directors 22a is small in the polarization direction which is incident in parallel to the liquid crystal directors and consequently the refractive index in the surroundings is high. How luminance profiles change according to the viewing angle of each parallax when there are the spacers 23 in the three-dimensional image display have been calculated with respect to respective cases where the refractive index in the surroundings differ from each other.

The refractive index of the spacers 23 is denoted by ns. The refractive index of the liquid crystal 22 in the direction of the directors 22a in the liquid crystal is denoted by Ne, and the refractive index of the liquid crystal in the direction perpendicular to the directors 22a is denoted by No. In the case of uniaxial liquid crystal, it follows that Ne>No.

Supposing that there is ns between Ne and No and ns is a value which conducts interior division between No and Ne with a ratio x:(1−x), it follows that $$x=(ns-No)/(Ne-No)$$

It is now supposed that x assumes a value in the range of 0 to 1, i.e., the refractive index ns of the spacers 23 changes from No to Ne. As for the liquid crystal material, liquid crystal which is large in refractive index anisotropy Δn is often used as the liquid crystal GRIN lens. Supposing that, for example, Ne=1.7 and No=1.5, therefore, the refractive index of plastics or a silica compound used as the material of the spacers 23 assumes a value in the range of Ne to No.

Figure 3:
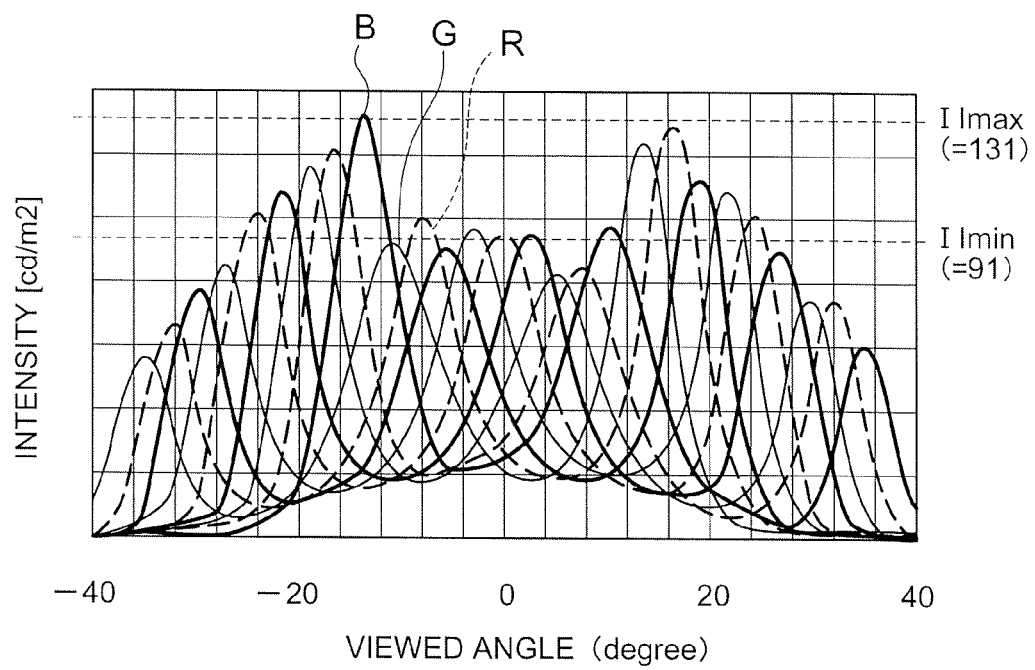
FIG. 3 is a diagram showing a luminance profile of every parallax image obtained when a spacer is disposed in the center of the lens.

For example, a result obtained by acquiring a luminance profile as a function of an viewing angle with commercially available light ray tracing software in the case of the refractive index ns which yields x=0.41 is shown. FIG. 3 shows luminance profiles as functions of the viewing angle in the case where a spacer 23 is placed in the center of the lens as shown in FIG. 2. In FIG. 3, B, G and R represent luminance profiles of blue, green, and red as functions of the viewing angle. The luminance profile as a function of the viewing angle means a luminance profile with an origin taken as the center of the lens. As appreciated from FIG. 3, luminance falling occurs between −10 degrees and 10 degrees in the viewing angle when the viewer views the display plane from the front.

Figure 4:
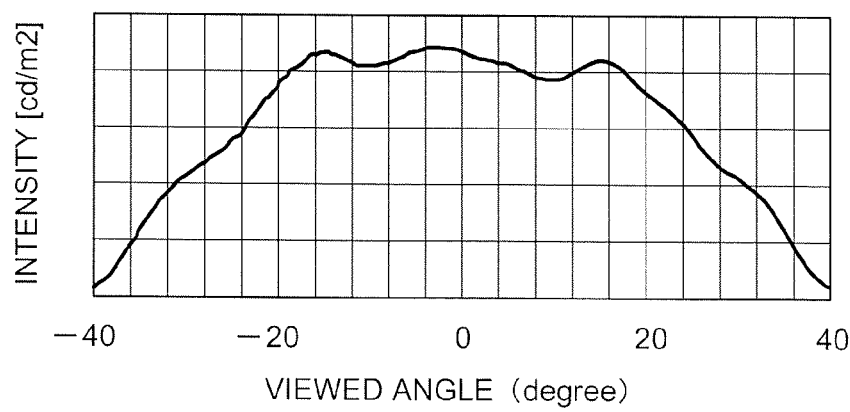
FIG. 4 is a diagram showing a luminance profile obtained by summing up all parallaxes when a spacer is disposed in the center of the lens.
Figure 5:
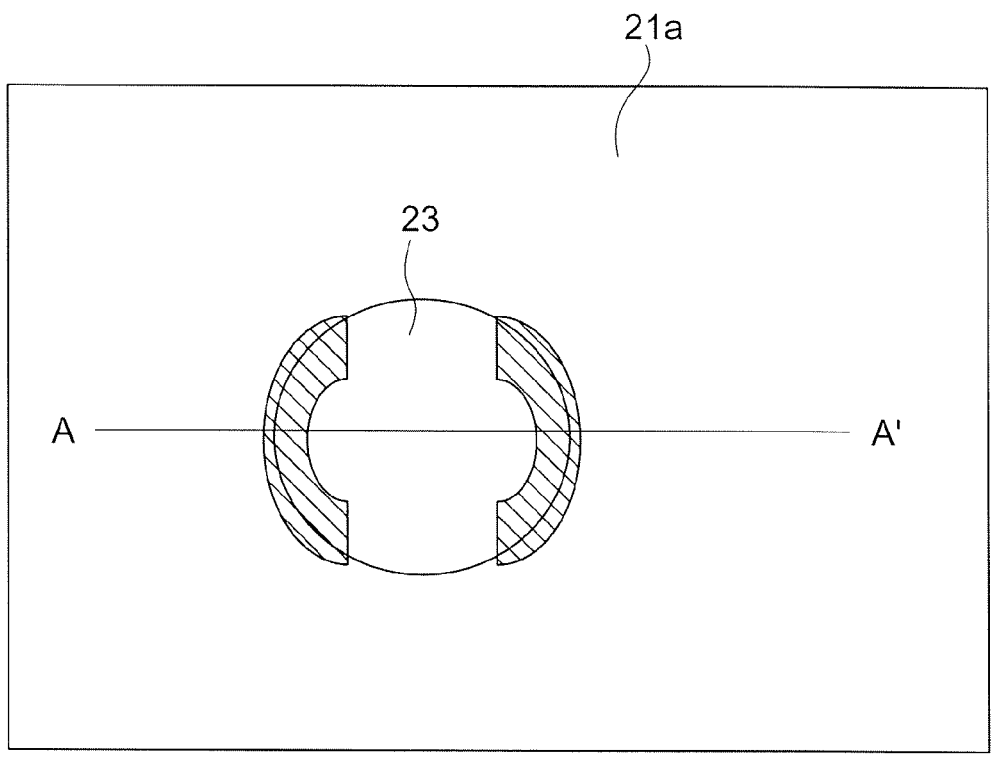
FIG. 5 is a diagram showing a part in which coloring occurs when a spacer is viewed from the viewer side.

FIG. 4 shows a luminance profile obtained when white is displayed in which all parallax images are lit. As for the visual perceptivity of the spacers 23, luminance degradation occurs at −10 degrees and 10 degrees as appreciated from FIG. 4. Also in the case where viewing with eyes is conducted, the greatest display degradation is felt as to the coloring phenomenon in the surroundings of the spacer. If color filters are actually arranged in the order of red, green, and blue in the horizontal direction, i.e., in the lens pitch direction, then colors of adjacent parallax light rays differ. FIG. 5 shows a diagram obtained by viewing the spacer 23 on the transparent substrate 21a from the front. In the case shown in FIG. 5, the spacer 23 is disposed in the center of the lens, and consequently the center of the spacer 23 becomes the origin. FIG. 4 shows a luminance change obtained when the viewer moves in a direction A-A' shown in FIG. 5. For example, if the viewer views from a viewing angle in the vicinity of −10 degrees, then the luminance of adjacent parallaxes in the spacer 23 suddenly falls, and consequently the color balance is degraded and a coloring phenomenon of shaded surrounding areas of the spacer 23 shown in FIG. 5 occurs.

As a measure of display degradation, a ratio between a local maximal value and a local minimal value at an angle at which the difference between luminance maximum values of adjacent parallaxes is great is taken. Denoting the luminance local maximal value by Ilmax and the luminance local minimal value by Ilmin, Ilmax=131 and Ilmin=91 in the vicinity of −10 degrees as appreciated from FIG. 3. As a result, the luminance degradation value becomes $$Il\text{max}/Il\text{min}=1.43$$

This is a level at which the viewer can perceive the luminance degradation caused by the spacer 23.

Figure 6:
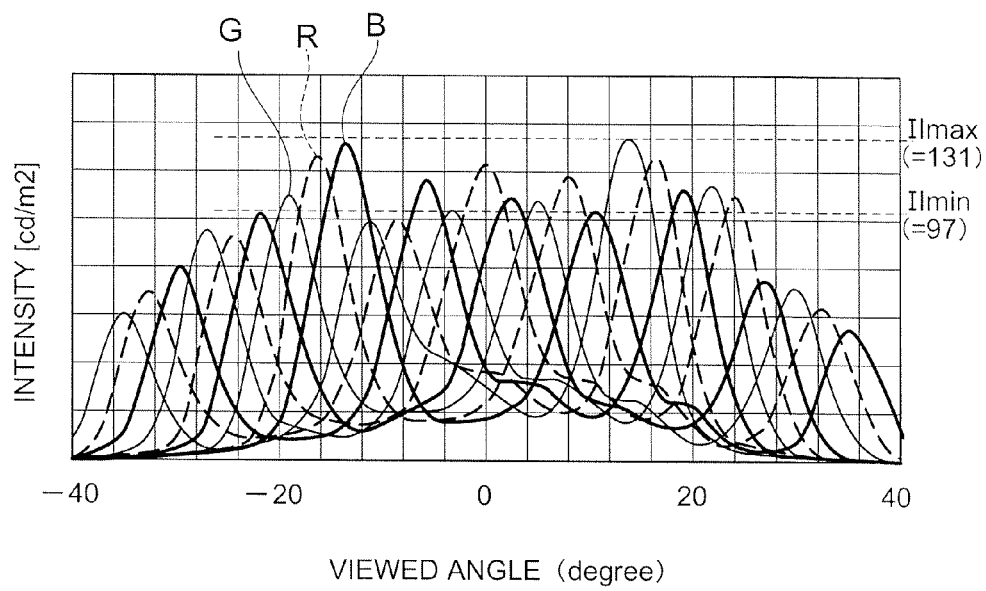
FIG. 6 is a diagram showing a luminance profile of every parallax image obtained when a spacer is disposed halfway between the lens center and the lens end.

FIG. 6 shows luminance profiles as functions of the viewing angle obtained when the spacer 23 is disposed between the lens center and the lens end although it is not shown. In FIG. 6, luminance degradation occurs at the viewing angle in the range of −10 to 10 degrees. As a result, luminance falling occurs in the lens center, and a coloring phenomenon in the surrounding of the spacer 23 is caused by falling of the color balance in the vicinities of −10 and 10 degrees.

The luminance degradation value in the case shown in FIG. 6 becomes $$Il\text{max}/Il\text{min}=1.35$$

because Ilmax=131 and Ilmin=97. This is a level at which the viewer can perceive the luminance degradation caused by the spacer 23.

Figure 7:
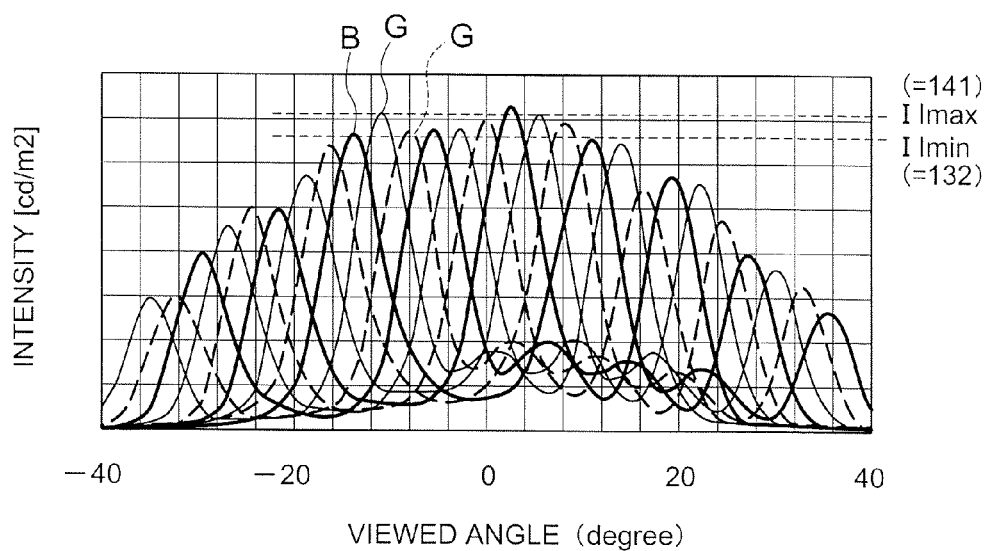
FIG. 7 is a diagram showing a luminance profile of every parallax image obtained when a spacer is disposed at the lens end.

Finally, FIG. 7 shows luminance profiles as functions of the viewing angle obtained when the spacer 23 is disposed at the lens end as shown in FIG. 1. In FIG. 7, luminance degradation is small at the viewing angle in the range of −10 to 10 degrees. In other words, luminance falling is small in the lens center. Therefore, the coloring phenomenon in the surroundings of the spacer caused by falling of the color balance is also slight. The luminance degradation value in the case shown in FIG. 7 becomes $$Il\text{max}/Il\text{min}=1.07$$

because Ilmax=141 and Ilmin=132. This is a level at which the viewer can hardly perceive the luminance degradation caused by the spacer 23.

As appreciated from the foregoing description, it is desirable that the spacer 23 is placed at the lens end where Ilmax/Ilmin becomes small in the case of the refractive index ns which brings about x=0.41.

Figure 8:
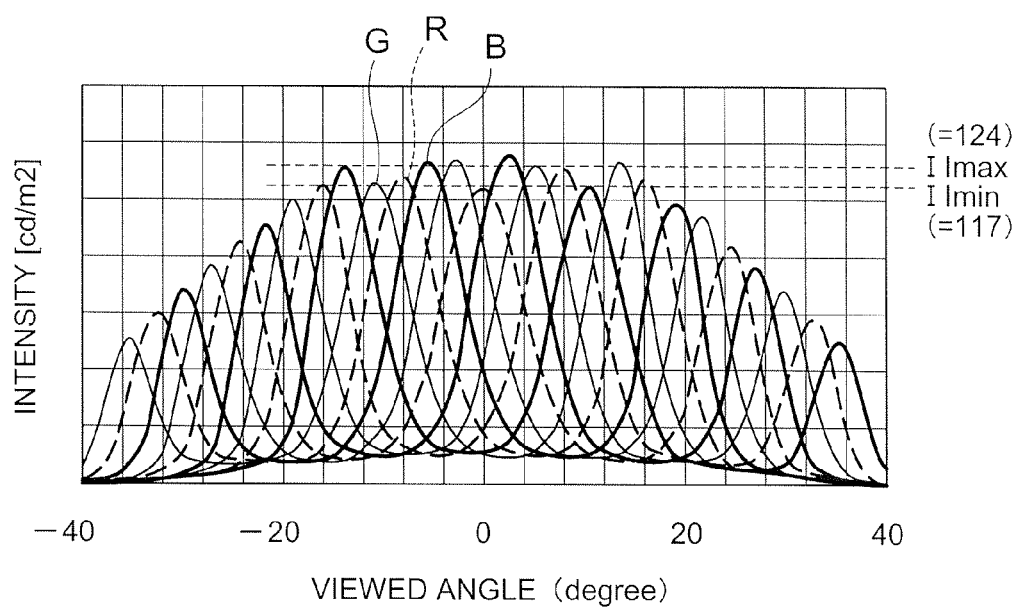
FIG. 8 is a diagram showing a luminance profile of every parallax image obtained when a spacer is disposed in the lens center.

FIG. 8 shows luminance profiles as functions of the viewing angle in the case where a spacer 23 is placed in the center of the lens as shown in FIG. 2 when the refractive index ns brings about x=0.91. The luminance degradation value in the case shown in FIG. 8 becomes $$Il\text{max}/Il\text{min}=1.06$$

because Ilmax=124 and Ilmin=117. This is a level at which the viewer can hardly perceive the luminance degradation caused by the spacer 23.

Figure 9:
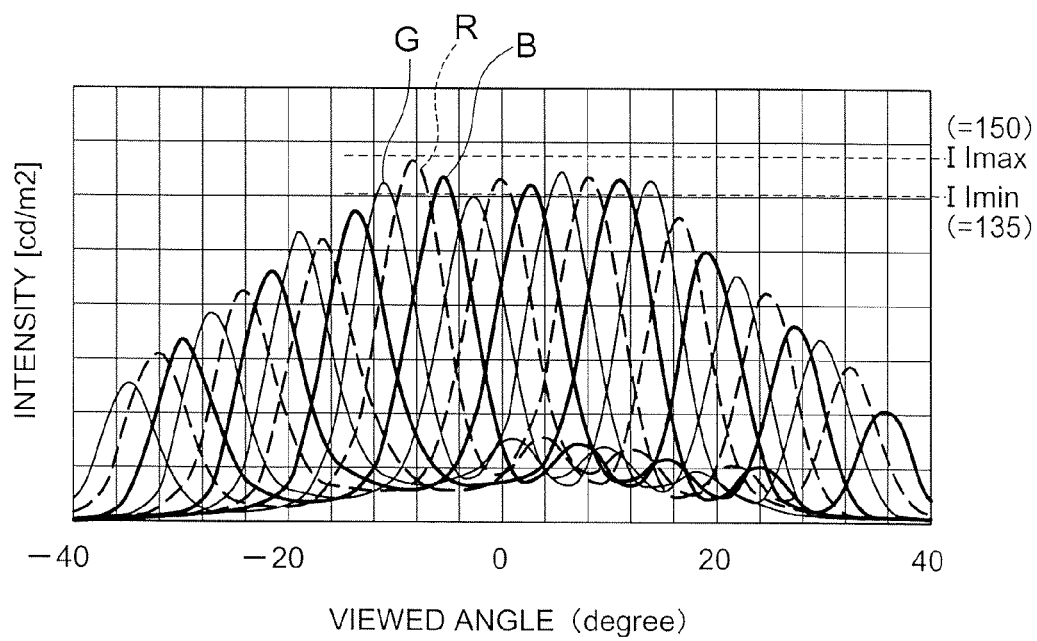
FIG. 9 is a diagram showing a luminance profile of every parallax image obtained when a spacer is disposed at the lens end.

FIG. 9 shows luminance profiles as functions of the viewing angle in the case where a spacer 23 is placed at the lens end as shown in FIG. 1. The luminance degradation value in the case shown in FIG. 9 becomes $$Il\text{max}/Il\text{min}=1.11$$

because Ilmax=150 and Ilmin=135. This is a level at which the viewer can perceive the luminance degradation caused by the spacer.

Simulation has been conducted as to dependence of luminance degradation (=Ilmax/Ilmin) upon x=(ns−No)/(Ne−No) in the case where the spacer 23 is disposed at the lens end as shown in FIG. 1 and in the case where the spacer 23 is disposed in the lens center as shown in FIG. 2. A result of the simulation is shown in FIG. 10.

Figure 10:
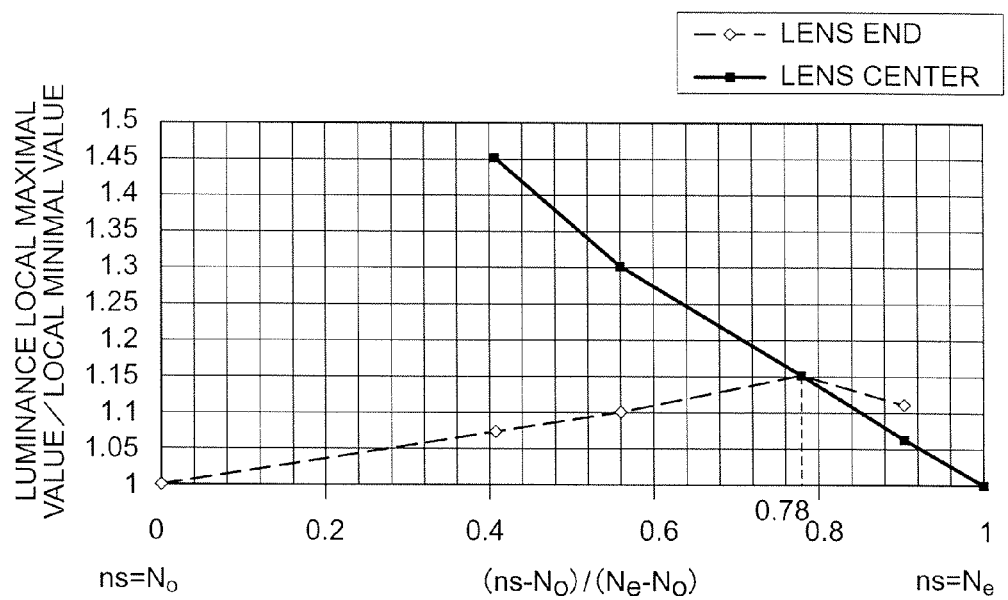
FIG. 10 is a diagram showing relations between a refractive index of a spacer and a luminance local maximal value/a luminance local minimal value.

In the case where the refractive index ns of the spacer is close to No, the value of the luminance degradation (=luminance local maximal value/luminance local minimal value) becomes closer to 1 as appreciated from FIG. 10 when the spacer 23 is disposed at the lens end as shown in FIG. 1. In the case where the refractive index ns of the spacer is close to No, the value of the luminance degradation (=luminance local maximal value/luminance local minimal value) becomes closer to 1 when the spacer is disposed in the lens center as shown in FIG. 2. However, the value of the luminance degradation abruptly increases if the refractive index becomes small. As appreciated from FIG. 10, therefore, the probability that the value of the luminance degradation (=luminance local maximal value/luminance local minimal value) will become smaller when the spacer is disposed at the lens end is high.

As appreciated from the foregoing description, to reduce the luminance degradation of the spacer 23 when displaying a three-dimensional image, the spacer 23 should be disposed at the lens end, considering the case where the refractive index of the spacer 23 is unknown as well.

If the refractive index Ne of the spacer 23 and the refractive index No of the liquid crystal are known accurately and x is 0.78 or less, i.e., the condition $$Ne \times 0.78 + No \times 0.22 \geq ns \geq No$$

is satisfied, then as appreciated from FIG. 10 the display degradation is kept to the minimum when displaying a three-dimensional image by disposing the spacer 23 in a place in the lens pitch where the refractive index becomes the highest, i.e., in a place (lens end) where the voltage applied to the liquid crystal becomes the greatest.

If x is greater than 0.78, i.e., the condition $$Ne \geq ns > Ne \times 0.78 + No \times 0.22$$

is satisfied, then as appreciated from FIG. 10 the display degradation is kept to the minimum when displaying a three-dimensional image by disposing the spacer 23 in a place in the lens pitch where the refractive index becomes the lowest, i.e., in a place (lens center) where the voltage applied to the liquid crystal becomes the smallest.

Figure 11:
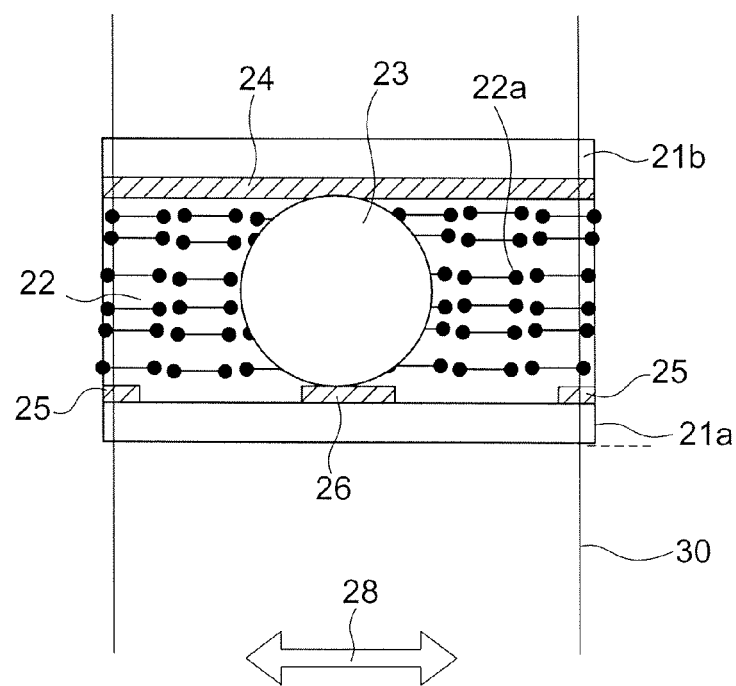
FIG. 11 is a diagram showing an optimum position for reducing display degradation caused by a spacer obtained when a two-dimensional image is displayed.

On the other hand, when displaying a two-dimensional image, all of the directors 22a in the liquid crystal 22 are arranged in the same direction as the substrates 21a and 21b and the lens effect does not appear as shown in FIG. 11. No matter where the spacer 23 is disposed, therefore, the same display is obtained. However, the visual perceptivity of the spacer 23 at the time when a two-dimensional image is displayed is lost by disposing the spacer 23 in the center of the lens and bringing the refractive index ns of the spacer 23 to Ne parallel to the directors 22a in the liquid crystal 22. FIG. 11 shows an optimum position of the spacer 23 when displaying a two-dimensional image in the case where the refractive index ns of the spacer is close to the refractive index Ne in the direction of the directors 22a. The spacer 23 is disposed in the center of the lens with the object of reducing the display degradation at the time when a three-dimensional image as described above is displayed.

Figure 12:
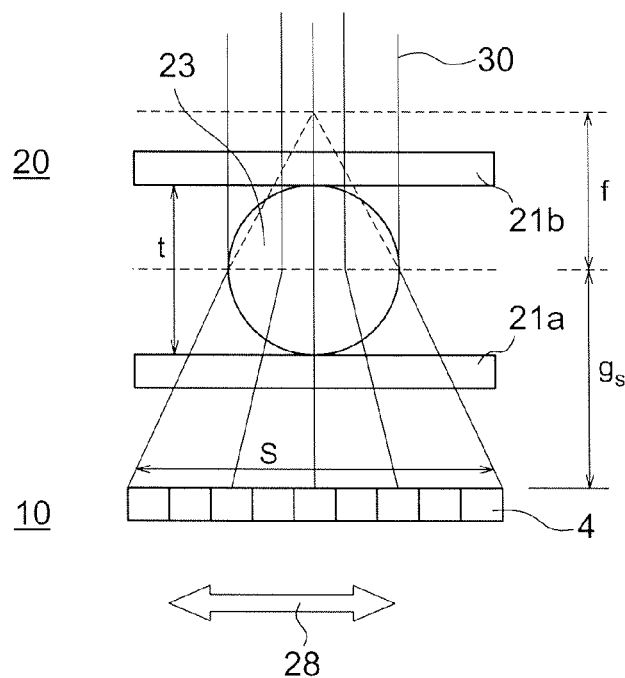
FIG. 12 is a diagram for explaining luminance degradation caused by a spacer when a two-dimensional image is displayed.

Supposing that the spacer 23 is a sphere, it is possible to geometrically regard the spacer as a spherical lens and estimate the display degradation at the time when a two-dimensional image is displayed. FIG. 12 is a sectional view including a gradient index lens and a display LCD, and FIG. 23 shows an optical trajectory in the case where the spacer 23 is a sphere and consequently the spacer 23 plays a role of a spherical lens. The liquid crystal gradient index (GRIN) lens uses liquid crystal having a high anisotropic refractive index in order to increase the refractive power. If the spacer 23 is made of a plastic material having high elastic power, therefore, then in general the possibility that the refractive index ns of the spacer satisfies the relation $$Ne > ns > No$$

is high. In the state shown in FIG. 11 in which no voltage is applied to the electrodes, therefore, the directors 22a in the liquid crystal 22 are parallel to the orientation plane. Accordingly, it is desirable that ns=Ne. However, it is possible to provide the refractive index of the spacer 23 with a certain range by finding an allowable range. As a result, the width of the use material is widened.

The reason why display degradation is caused by the spacer 23 is that only in a part where there is the spacer 23 light rays from the viewer spread on an LCD pixel and luminance falls as shown in FIG. 12. In FIG. 12, f is a focal length of a spherical lens 20, gs is a distance between a center 20 of the spacer and a pixel 4, S is an area where light is spread by the spacer 23, and t is a thickness of the spacer 23. All of gaps are converted air lengths.

Figure 13:
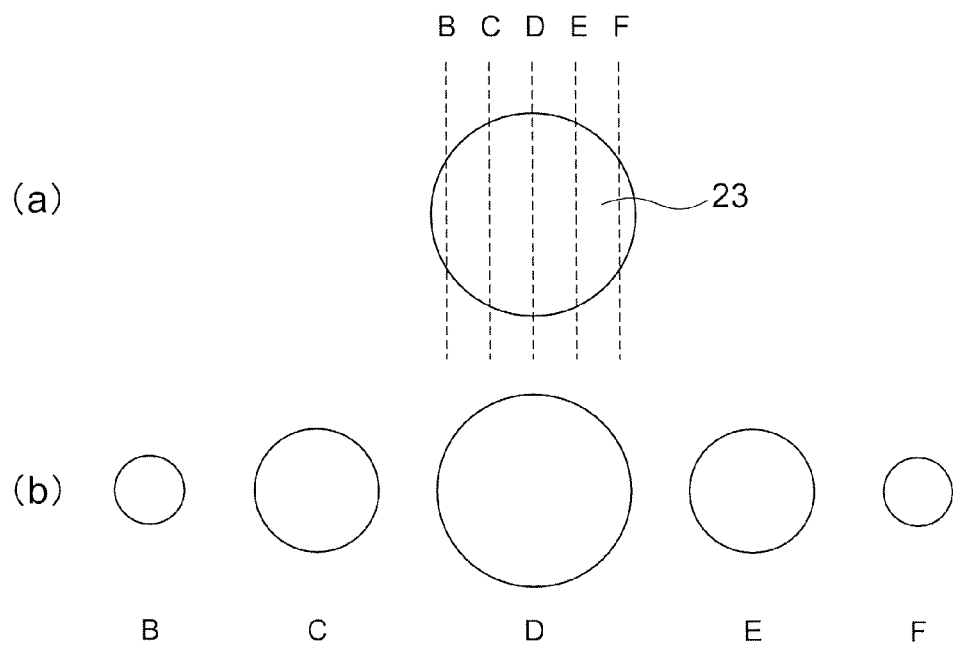
FIG. 13 is a diagram for explaining that the size differs according to the position of a spherical spacer.

If the spacer 23 is a sphere, the size of the spacer in the sectional view differs according to the place as shown in FIG. 13. Sectional views of the spacer 23 at cut planes B, C, D, E, and F shown in FIG. 13(a) are shown in FIG. 13(b). The refractive power of the spacer 23 becomes the greatest in the center position D. If the substrates 21a and 21b are glued to the spacer 23 as shown in FIG. 12, therefore, the center position D is considered to be the place where the display degradation is maximized. Luminance degradation caused by the spacer 23 in the case shown in FIG. 12 is found as described hereafter.

First, as for the allowable limits of the spacer 23, it is supposed that display degradation occurs when the luminance increases by 5% or more, or decreases by 5% or more as compared with the luminance in the surroundings. For example, if the luminance degradation caused by the spacer 23 assumes a value in the range of 0.8 to 1.2, then the luminance degradation assumes a value in the range of 0.95 to 1.05 on average by an optical calculation supposing that the spacer is a sphere as shown in FIG. 13.

Therefore, the condition in the case where the luminance degradation ratio as compared with the surroundings is in the range of 0.8 to 1.2 is regarded as an allowable value. Furthermore, in the ensuing description, the viewing angle is 2θ, the pitch of the GRIN lens is lp, the thickness of the spacer is t, and the focal length at the time when the spherical spacer is considered to be a lens is fs.

As appreciated from FIG. 12, the relation between the focal length fs and the distance gs between the spacer center and the pixel is represented by the following equation on the basis of similarity conditions of a triangle $$S:t=(fs+gs):fs \quad (1)$$

where S is a range of spread.

Figure 14:
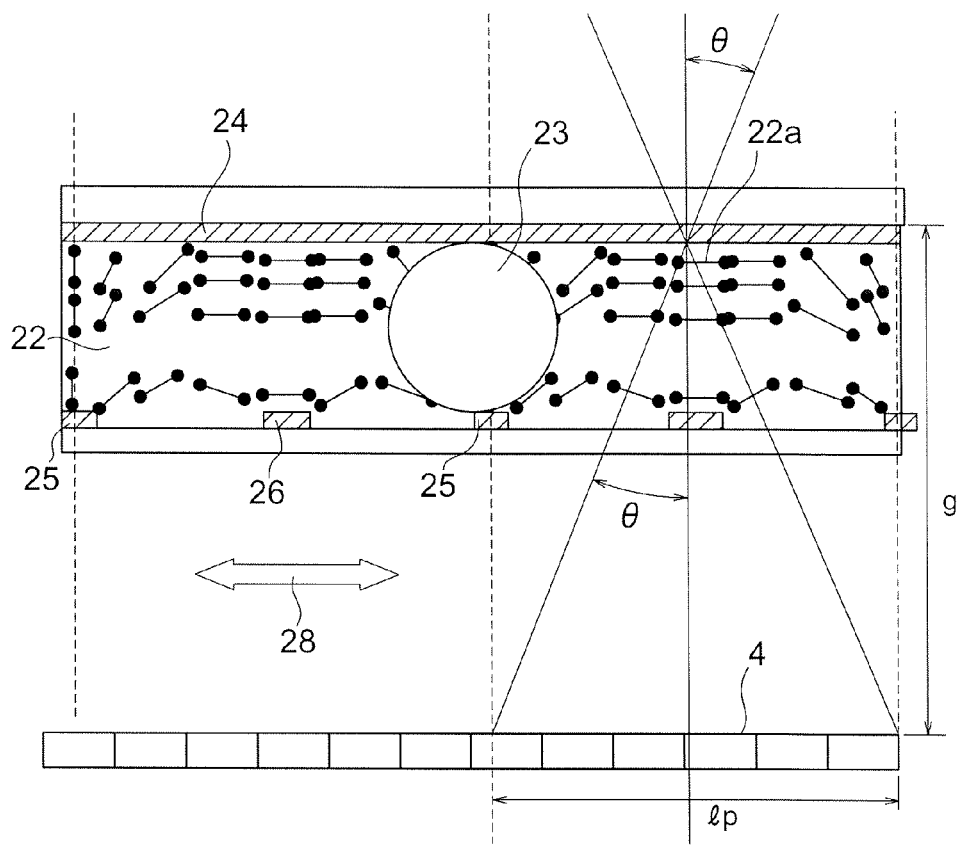
FIG. 14 is a diagram for explaining relations between a viewing angle and a lens-pixel distance in an embodiment.

As shown in FIG. 14, a GRIN lens is formed of liquid crystal sandwiched between first and second substrates and a predetermined electrode structure according to claim 1. The center of the lens face in the GRIN lens is located on the second substrate having a third electrode, i.e., on the glass substrate side on the viewer side. Therefore, it is desirable to make the focal length f of the GRIN lens coincide with a gap g between the third electrode plane and the pixel plane shown in FIG. 14. gs in FIG. 12 and g in FIG. 14 have the following relation.

$$gs=g-t/2$$

A relation between the viewing angle 2θ and the distance gs between the spherical lens and the pixel will now be described with reference to FIG. 14. Denoting the lens pitch by lp and using θ which is half of the viewing angle, the following equations are obtained according to trigonometric functions.

$$\tan\theta = lp/(2g)$$

$$\tan\theta = lp/(2(gs+t/2))$$

$$gs = lp/(2\tan\theta) - t/2 \quad (2)$$

Since the light ray flux having the width t spreads to the width S, the luminance degradation can be made equal to t/S. From Equation (1), $$t/S = fs/(fs+gs)$$

Therefore, a condition for satisfying the following equation $$0.8 < fs/(fs+gs) < 1.2 \quad (3)$$

will be found.

The spacer 23 is a biconvex lens having a radius of curvature t/2. The radius of curvature depending upon the refractive index in the surroundings will be calculated. First, a basic equation is derived.

Figure 15:
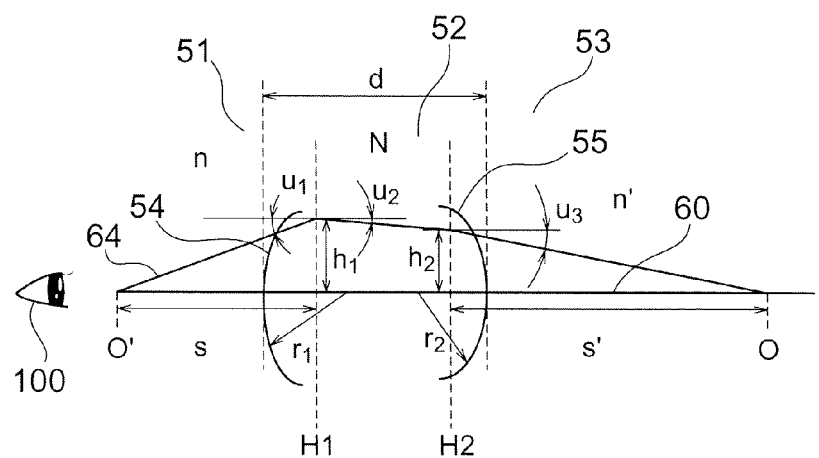
FIG. 15 is a diagram for explaining derivation of a focal length of a spacer when the spacer is formed as a biconvex lens.

The focal length of the biconvex lens is calculated with reference to FIG. 15. FIG. 15 is a diagram showing a trajectory of a light ray of the biconvex lens 52 having curved lens faces 54 and 55 of two kinds. The biconvex lens 52 is formed of media having a refractive index N. A viewer 100 side is formed of a medium 51 having a refractive index n, and an opposite side from the viewer 100 is formed of a medium 53 having a refractive index n'.

In FIG. 15, $u_1$, $u_2$ and $u_3$ are incidence angles with respect to an optical axis 60 in the media 51, 52, and 53 having refractive indexes n, N, and n', respectively. H1 and H2 are an object side principal point and an image side principal point, respectively. In FIG. 15, h1 and h2 are heights from the optical axis 60 at the time when a certain light ray is incident on the respective lens faces 54 and 55, respectively, and r1 and r2 are radii of the lens faces 54 and 55. The focal length f represents a distance between a principal point and a focal point at the time when parallel light rays from the viewer 100 side in FIG. 15 are incident on the lens. In FIG. 15, the focal length f is a distance s' between the image side principal point H2 and the focal point O, and d is a length in the thickest part between the convex lenses. From FIG. 15, the following relations are derived.

$$Nu_2 = nu_1 + \left(\frac{N-n}{r1}\right)h1$$

$$n'u_3 = Nu_2 + \left(\frac{n'-N}{r2}\right)h2$$

$$h2 = h1 - du2$$

From the three equations, we get $$n'u3 = n\left\{1 - \frac{d}{N}\left(\frac{n'-N}{r2}\right)\right\}u1 + \quad (4)$$

$$\left\{\left(\frac{N-n}{r1} + \frac{n'-N}{r2}\right) - \frac{d}{N}\left(\frac{N-n}{r1}\right)\left(\frac{n'-N}{r2}\right)\right\}h1$$

$$\frac{1}{f} = \frac{u3}{h1}(\text{at } u1=0) = \frac{1}{n'}\left\{\left(\frac{N-n}{r1} + \frac{n'-N}{r2}\right) - \frac{d}{N}\left(\frac{N-n}{r1}\right)\left(\frac{n'-N}{r2}\right)\right\}$$

It is appreciated from Equation (4) that there are relations among the refractive index difference between the biconvex lens 52 and the media 51 and 53, radii of curvature r1 and r2, and the lens thickness d if the focal length f is supposed to be constant. Considering easiness in manufacture, it is supposed that the radii of curvature r1 and r2 of the biconvex lens 52 are the same, and the refractive index n of the outermost medium 51 (on the viewer 100 side) and the refractive index n' of the innermost medium 53 (on the side opposite from the viewer 100 side) are the same. Thereupon, Equations (5) and (6) are led from Equation (4).

$$\frac{1}{f} = \frac{(N-m)}{m}\left(2 - \frac{(N-n)d}{Nr}\right) \quad (5)$$

$$d = \frac{Nr}{(N-n)}\left(2 - \frac{rn}{f(N-n)}\right) \quad (6)$$

If the spacer 23 is a biconvex lens, then the radius of curvature r=t/2, the focal length f=fs, the distance d between a front side principal point and a back side principal point in a lens sectional view=t, a medium of the biconvex lens 23 is ns, and a medium on the viewer side and a medium on the opposite side is Ne. Substituting them into Equation (2), we get $$1/fs = 4(ns-Ne)/t/ns$$

$$fs = t \times ns/4/(ns-Ne) \quad (7)$$

If ns<Ne, Equation (7) assumes a negative value. Therefore, its absolute value is taken as follows:

$$fs = t \times ns/4/(Ne-ns) \quad (8)$$

Taking a reciprocal number of Equation (3), $$0.83 < 1 + gs/fs < 1.25$$

$$-0.17 < gs/fs < 0.25 \quad (9)$$

Meaning of Equation (9) will now be described. gs is a value obtained by subtracting half of the thickness of the spacer from the gap g between the lens and the pixel in the liquid crystal GRIN lens. In general, g>>t/2, and consequently gs becomes nearly g. The gap g between the lens and the pixel in the liquid crystal GRIN lens depends upon the lens pitch and the viewing angle according to Equation (2). The lens pitch is a value obtained by multiplying a sub-pixel width which is an elemental image width nearly forming one pixel of the parallax image by the number of parallaxes. The viewing angle indicates a range over which a three-dimensional image is seen normally. Both the lens pitch and the viewing angle depend upon the performance request of the three-dimensional image. On the other hand, the focal length fs obtained from the spherical lens of the spacer has a value depending upon the thickness t of the spacer, a difference (ns−Ne) between the refractive index Ne of the liquid crystal and the refractive index ns of the spacer at the time of two-dimensional image display, and the refractive index ns of the spacer, as represented by Equation (8).

As Equation (9) gets nearer 0, the refractive power of light rays given by the spacer at the time of two-dimensional image display is low, the spread width S of light gets closer to the width t of the spacer, and the spacer is not visually perceived. Therefore, it is desirable that gs has a small value and fs has a large value. For gs to assume a small value, it is desirable according to Equation (2) that the lens pitch lp is small and the 3D viewing angle 2θ is large.

To provide fs with a large value, it is desirable according to Equation (8) that (ns−Ne) assumes a value close to 0, i.e., ns assumes a value close to Ne. According to Equation (8), fs can be made small if t assumes a large value. If the thickness t of the spacer increases, the refractive power of the liquid crystal GRIN lens can be increased. Since the spacer is spherical, however, the increase of the thickness t increases the size t in the width direction as well, increases the visual perceptivity, resulting in degradation. Therefore, the countermeasure of increasing t requires circumspection. Since the thickness t of the spacer depends upon the performance request of the three-dimensional image, it cannot be changed freely. For example, the thickness t of the spacer=the width t of the spacer can be made smaller than the sub-pixel width, however, there is no coloring caused by the spread S of light on the pixel plane, and degradation caused by visual perceptivity can be reduced.

Substituting Equation (2) and Equation (8) into Equation (9), we get $$-0.17 < \frac{2(n_s - Ne)}{t \times n_s}\left(\frac{l_p}{\tan\theta} - t\right) < 0.25 \quad (10)$$

If the refractive index ns of the spacer 23 is made to satisfy Equation (9), the luminance degradation caused by the spacer 23 can be suppressed to ±5% or less.

Hereafter, the reason why it is desirable to dispose the spacers 23 on vertexes of a regular triangle periodically in the stereoscopic image display mode will be described.

It has been described that luminance degradation is caused in the two-dimensional image display and three-dimensional image display by the difference between the refractive index of the spacer 23 and the refractive index of the liquid crystal. Since the spacers must play a role of maintaining the gap, a density of the spacers which endures a required withstanding load is needed in manufacture or reliability. When disposing the spacers, it is possible to endure the load with the same area and a smaller spacer density by disposing the spacers at equal intervals.

Figure 16:
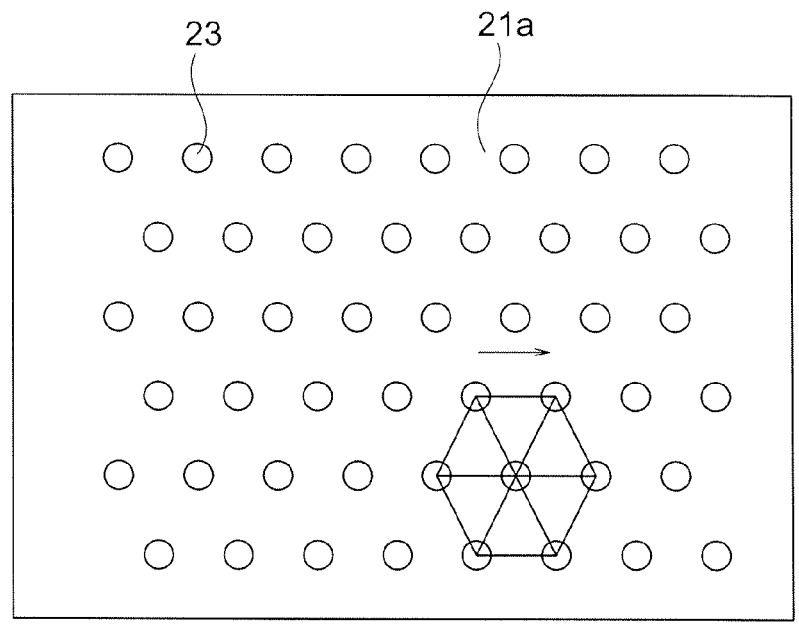
FIG. 16 is a diagram showing arrangement of spacers.

It is now supposed that the spacers are arranged in a zigzag pattern as shown in FIG. 16. If one spacer 23 is disposed on each vertex of a regular triangle and the length of a side of the regular triangle is 1 cm, the area becomes $$\tfrac{1}{2}(\sqrt{3})/2 = 0.865$$

As a result, the density becomes 1 piece/0.865 cm²=1.15 (piece/cm²).

Figure 17:
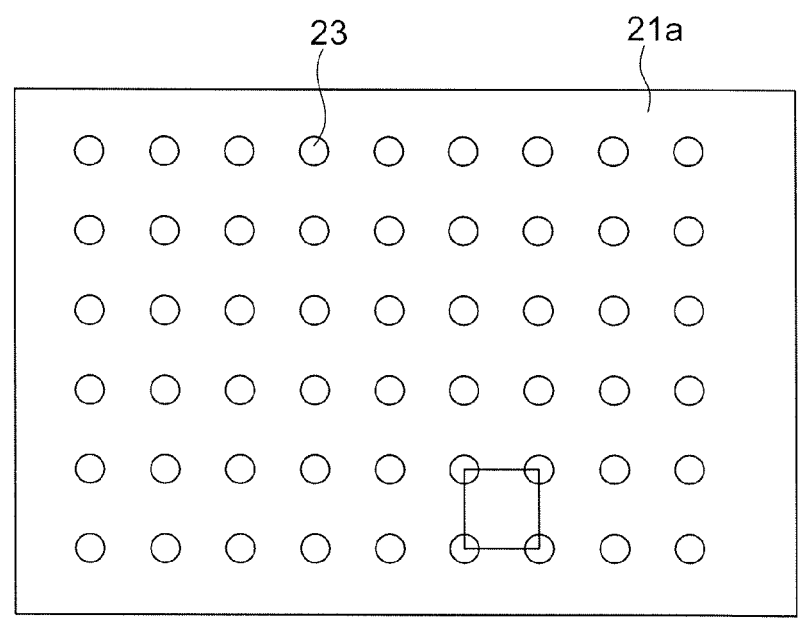
FIG. 17 is a diagram showing arrangement of spacers.

If the spacers are arranged in a grid pattern as shown in FIG. 17, one spacer 23 is disposed on each vertex of a square, and the length of a side of the square is 1, then the area becomes $$1 \times 1 = 1$$

As a result, the density becomes 1 piece/1 cm²=1 (piece/cm²).

Since the spacer density and the withstanding load are the same, the interval between the spacers 23 becomes √1.15=1.075 and the spacer interval can be made longer in FIG. 16. Therefore, the degradation caused by the spacers 23 is less in the case of FIG. 16. Furthermore, in the zigzag pattern, the visual perceptivity of the spacers 23 in subjective evaluation also becomes lower as compared with the grid pattern.

Figure 18:
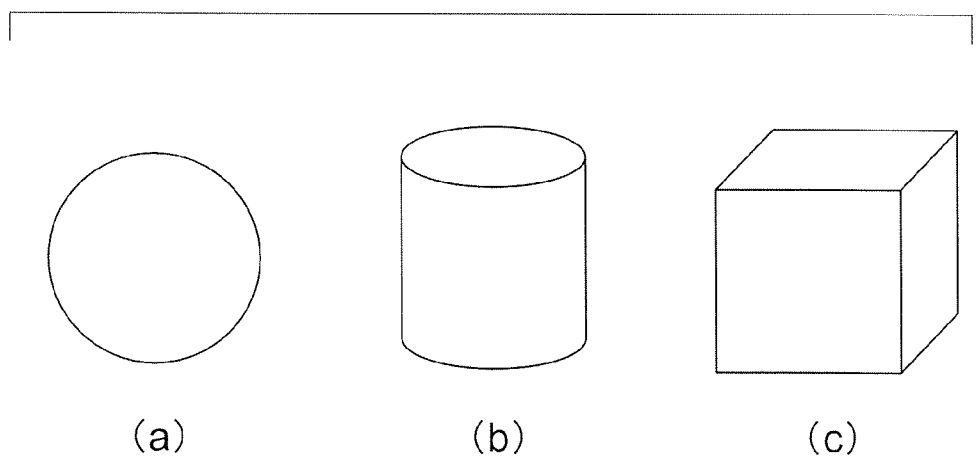
FIGS. 18(*a*) to 18(*c*) are diagrams for explaining shapes of the spacer.

In the foregoing description, the spacer 23 is supposed to be a sphere as shown in FIG. 18(*a*). However, similar effects can be obtained even if the spacer is a column as shown in FIG. 18(*b*) or a rectangular parallelepiped as shown in FIG. 18(*c*).

According to the present embodiment, it is possible to provide an autostereoscopic image display apparatus having a changeover function between two-dimensional image display and three-dimensional image display capable of suppressing the display degradation as described heretofore.

While certain embodiments have been described, these embodiments have been presented by way of example only, and are not intended to limit the scope of the inventions. Indeed, the novel methods and systems described herein can be embodied in a variety of other forms; furthermore, various omissions, substitutions and changes in the form of the methods and systems described herein can be made without departing from the spirit of the inventions. The accompanying claims and their equivalents are intended to cover such forms or modifications as would fall within the scope and spirit of the inventions.

What is claimed is:

1. An autostereoscopic image display apparatus comprising:
   a plane display device comprising pixels arranged in a matrix form; and
   an optical plate provided in front of the plane display device to control light rays illuminated from the pixels, the optical plate including:
   first and second substrates, each being transparent to light;
   liquid crystal sandwiched between the first substrate and the second substrate;
   first electrodes arranged periodically on a first plane of the first substrate opposed to the second substrate and supplied with a first voltage;
   second electrodes disposed on the first plane of the first substrate and between first electrodes adjacent and supplied with a second voltage which is lower than the first voltage;
   a third electrode provided on a second plane of the second substrate opposed to the first substrate and supplied with a third voltage which is equal to or less than the second voltage; and
   at least one spacer provided between the first substrate and the second substrate to hold a space between the first substrate and the second substrate,
   wherein denoting a refractive index of the liquid crystal in a director direction by Ne, denoting a refractive index of the liquid crystal in a direction perpendicular to the director direction by No, and denoting a refractive index of the spacer by ns,
   the spacer is disposed on the first electrode if a condition $$Ne \times 0.78 + No \times 0.22 \geqq ns \geqq No$$

is satisfied.

2. The apparatus according to claim 1, wherein
   the third electrode is provided to be opposed to the first and second electrodes, and
   the first electrodes are provided to extend in a column parallel to the plane of the pixels.

3. The apparatus according to claim 1, wherein the third voltage is substantially same voltage as the second voltage.

4. The apparatus according to claim 1, wherein the spacers are disposed periodically to cause three adjacent spacers to become vertexes of a regular triangle.

5. The apparatus according to claim 1, wherein the spacer is a sphere, a column, or a rectangular parallelepiped.

6. An autostereoscopic image display apparatus comprising:
   a plane display device comprising pixels arranged in a matrix form; and
   an optical plate provided in front of the plane display device to control light rays illuminated from the pixels, the optical plate including:
   first and second substrates, each being transparent to light;
   liquid crystal sandwiched between the first substrate and the second substrate;
   first electrodes arranged periodically on a first plane of the first substrate opposed to the second substrate and supplied with a first voltage;
   second electrodes disposed on the first plane of the first substrate and between adjacent first electrodes and supplied with a second voltage which is lower than the first voltage;
   a third electrode provided on a second plane of the second substrate opposed to the first substrate and supplied with a third voltage which is equal to or less than the second voltage; and
   at least one spacer provided between the first substrate and the second substrate to hold a space between the first substrate and the second substrate,
   wherein denoting a refractive index of the liquid crystal in a director direction by Ne, denoting a refractive index of the liquid crystal in a direction perpendicular to the director direction by No, and denoting a refractive index of the spacer by ns,
   the spacer is disposed on the second electrode if a condition $$Ne \geqq ns > Ne \times 078 + No \times 0.22$$

is satisfied.

7. The apparatus according to claim 6, wherein
   the third electrode is provided to be opposed to the first and second electrodes, and
   the first electrodes are provided to extend to a column parallel to the plane of the pixels.

8. The apparatus according to claim 6, wherein the third voltage is substantially same voltage as the second voltage.

9. The apparatus according to claim 6, wherein the spacers are disposed periodically to cause three adjacent spacers to become vertexes of a regular triangle.

10. The apparatus according to claim 6, wherein the spacer is a sphere, a column, or a rectangular parallelepiped.

* * * * *